March 16, 1954 H. A. REITFORT 2,672,287

RECORD STRIP POSITIONING DEVICE

Filed April 11, 1951

6 Sheets-Sheet 1

INVENTOR
H.A. REITFORT

J.W. Armbruster
ATTORNEY

March 16, 1954 H. A. REITFORT 2,672,287

RECORD STRIP POSITIONING DEVICE

Filed April 11, 1951

6 Sheets-Sheet 2

INVENTOR
H. A. REITFORT

BY J W Armbruster
ATTORNEY

March 16, 1954 H. A. REITFORT 2,672,287

RECORD STRIP POSITIONING DEVICE

Filed April 11, 1951

6 Sheets-Sheet 3

INVENTOR
H. A. REITFORT

BY J W Armbruster
ATTORNEY

INVENTOR
H. A. REITFORT
BY J W Armbruster
ATTORNEY

March 16, 1954 H. A. REITFORT 2,672,287
RECORD STRIP POSITIONING DEVICE
Filed April 11, 1951
6 Sheets-Sheet 5
FIG. 3.
| DIGIT | CARD LINE SELECTION LS RELAYS ENERGIZED — FROM CARD — TENS | FROM CARD — UNITS | TRANSFER — TENS | TRANSFER — UNITS | TAPE CHANNELS PUNCHED IN CODE — TENS (4 5 6 7) | UNITS (8 9 10 11) |
|---|---|---|---|---|---|---|
| 0 | 6 | 2 | 14, 18 | 10, 17 | 5 | 9 |
| 1 | 5 | 1 | 13, 18 | 9, 17 | 4 | 8 |
| 2 | 5, 6 | 1, 2 | 13, 14 | 9, 10 | 4, 5 | 8, 9 |
| 3 | 7 | 3 | 15, 18 | 11, 17 | 6 | 10 |
| 4 | 7, 5 | 3, 1 | 15, 13 | 11, 9 | 4 6 | 8 10 |
| 5 | 7, 6 | 3, 2 | 15, 14 | 11, 10 | 5, 6 | 9, 10 |
| 6 | 8 | 4 | 16, 18 | 12, 17 | 7 | 11 |
| 7 | 8, 5 | 4, 1 | 16, 13 | 12, 9 | 4 7 | 8 11 |
| 8 | 8, 6 | 4, 2 | 16, 14 | 12, 10 | 5 7 | 9 11 |
| 9 | 8, 7 | 4, 3 | 16, 15 | 12, 11 | 6, 7 | 10, 11 |
FIG. 4.
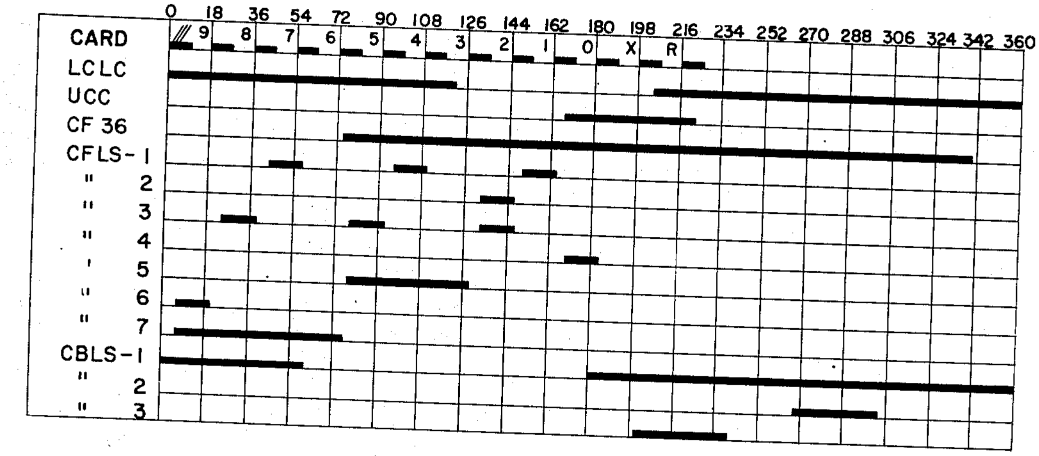
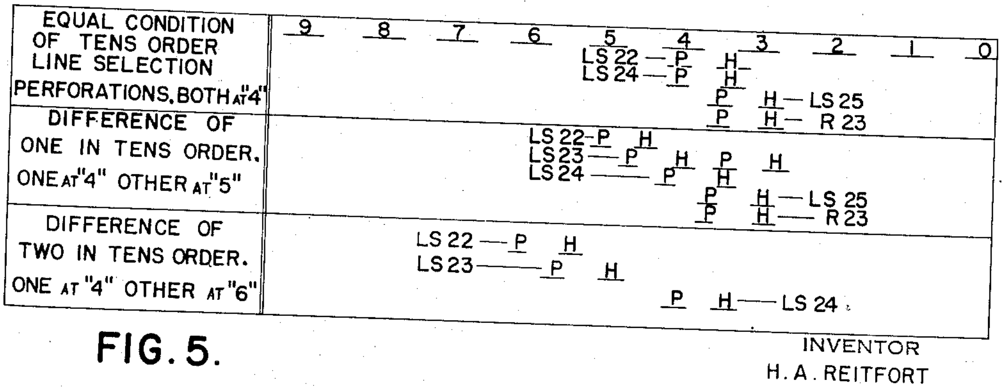
FIG. 5.
INVENTOR
H. A. REITFORT
BY
J W Armbruster
ATTORNEY March 16, 1954 H. A. REITFORT 2,672,287

RECORD STRIP POSITIONING DEVICE

Filed April 11, 1951

6 Sheets-Sheet 6

INVENTOR
H. A. REITFORT

BY J W Armbruster
ATTORNEY

Patented Mar. 16, 1954

2,672,287

UNITED STATES PATENT OFFICE 2,672,287

RECORD STRIP POSITIONING DEVICE

Henry A. Reitfort, Vestal, N. Y., assignor to International Business Machines Corporation, New York, N. Y., a corporation of New York Application April 11, 1951, Serial No. 220,494

24 Claims. (Cl. 235—61.7)

This invention is concerned with record spacing devices and more particularly with the selection of print receiving lines on a record strip or sheet according to a comparison of line selection indicia on record cards with corresponding coded line selection indicia on a feed control tape which is synchronized in movement with the record sheet.

The invention is illustrated as an improvement on the tape controlled record feeding devices of the kind disclosed in Patent No. 2,531,885, to A. W. Mills et al., filed August 9, 1945, and issued on November 28, 1950.

An object of the invention is to provide rapid automatic selection of printing positions for reception of item and total printing impressions under control of records. The record cards contain line selection indicia in a plurality of columns to be representative of a multi-denominational number for selection of a record sheet line in any one of 99 positions. On the feed control tape, two sets of four channels are provided for related line selection code indicia to be compared with the card indicia for selection of corresponding or related lines on record sheet. The tape indicia is placed in a predetermined relationship with the lines of the record sheet and not necessarily at the same line represented by the numbers of the coded indicia. For example, feeding a card perforated with the number 15 and the tape similarly coded with two combinations of four perforations per denomination representing 15, these two coded sets of perforations may be representative of a line other than line 15 on a record sheet by having the coded tape perforations arranged to stop the record sheet in any line position, and stoppage at line 7 or line 97 position is possible with any code designation such as 15.

An object of the invention is to provide faster, more economical and more flexible record strip feeding devices. The control circuits are simple and with few relays in coded relationships rather than digital relationships. They provide means for skipping to a heading start or predetermined total line anywhere on a form. For listing, line selection indicia are put on each card; and for tabulating, a heading or first item card bears the line selection indicia for the group. They also provide means for using longer forms than usual with faster feed operation with a maximum of 19 lines of skipping without loss of tabulator card reading time.

Another object of the invention is the provision of means for controlling sheet feeding means so that a predetermined line of the sheet is reserved for printing a record of a selected item or a selected total of a group of records. The record cards are arranged in succession and proper sequence and the line selection indicia of said cards are selected to have predetermined relationships with the lines of the record sheet so that certain items and totals are recorded on certain lines. Although it is usual that the line selection coded numbers are similar to the lines of the sheet to be selected thereby, there is no necessity for such fixed relationships, and differences can exist between the code line indicia and the line positions selected. Therefore, a feature of the invention is the provision of tape controlled feeding devices having such flexibility that any datum can be recorded on any pre-selected line.

A further object of the invention is the provision of electrical tape controls governed by coded relays set up to be compared with the contacts closed by similar coded relays actuated by sensing means cooperating with control records.

Another object of the invention is the provision of two record controlled sets of coded line selection relays for operating contacts and labyrinth circuits to select stopping positions of a record receiving strip or sheet advanced under control of automatic feeding devices. In the two sets of control relays plural ordered line selection numbers are set up for comparison, one set by cards and the other set by tape so that a corresponding line position may be determined. In order to arrange the labyrinth circuits for a multi-denominational style of cooperation with the feed control tape, the contact roller of the tape is split into two sections representative of units and tens denominations of line selection numbers. The labyrinth circuit is arranged to carry impulses back and forth, first passing through contacts leading up to one tape sensing brush and then going back through other contacts after passing through a second tape sensing brush and then following a similar course through the other denominational arrangement of four brushes cooperating with the other section of the contact roller.

Another object of the invention is the provision of means involving coded combination relays operated singly and in combination to be representative of digits. The control is devised to select the manner in which the labyrinth circuit is to be used according to whether single or double code selections are made. In each denomination a control relay is picked up in the case of single code combinations. This relay determines that the labyrinth is entered by a pulse at the halfway mark because on such occasions it is unnecessary to go back and forth in the labyrinth, but merely enter in a fashion to pass through a single tape sensing brush. In the instances involving two denominations, a pair of such control relays are provided, each of which is picked up by series circuit responsive to single contact shifting but unresponsive to shifting of contacts in multiple.

Another object of the invention is to provide means for preventing the selection of a recording position by single line selection code indicia when a double line selection is called for. For example, when the selection is for line 25, the tape controls of feeding must be prevented from stopping when line 5 is sensed. For this purpose electrical controls are provided and in the case of line selection by multiple code reading the controls are picked up by all parts of the circuits which should be used and only broken by actual use thereof. When both parts of a line selection circuit are supposed to be used to select the sheet position, then a control relay is picked up by two parts of the circuit and only dropped out if both of those parts are eventually employed in determining the line position. A relay is picked up by the dual action source contact shift relays already noted and this relay breaks the feed control circuit until both parts of the control come into operation.

Another object of the invention is the provision of means for suspending tabulator printing operation during extra long sheet feeding operations. The machine is provided with electrical detection devices for detecting changes in line selection numbers greater than 19, i. e., differences of two or greater in the tens order indicating a call for paper feed movement equal to or greater than 20 line spaces. For advances of such lengths it is advisable to suspend card feeding and printing operation until the record sheet advance is completed. This control is accomplished by means of a seriatum pick-up and hold sequence of four relays. The relays are wired to sensing devices for comparing the tens order code indicia of successive record cards and thereby picking up one after another of the control relays. An advancing chain of pickup and hold control from relay to relay is accomplished by equality, or differences of one in the tens order of line selection perforations of successive cards. However, if two cards in sequence have a difference in the tens order line selection perforations of two or more, then there is such a time interval between the pairs of impulses that the chain of successive relay pickup and hold is broken and the last relay fails to be picked up and then this one is effective to cause tabulator delay control.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagrammatic perspective view showing the main components of the line selecting devices.

Figs. 2*a*–2*d* comprise a wiring diagram showing the electrical controls of the line selecting devices as associated with the related tabulator and tape carriage controls of Patent 2,531,885.

Fig. 3 is a chart showing the relationship between the various digits and code perforations of such digits in the cards and tape to pick up related line selection relays.

Fig. 4 is a timing chart showing the effective times of the various cam contacts provided for line selection control.

Fig. 5 is a chart showing the timing of pickup and holding conditions of a series of relays devoted to detecting differences of line selection numbers involving record sheet advances of 20 or more line spaces.

Figure 1:
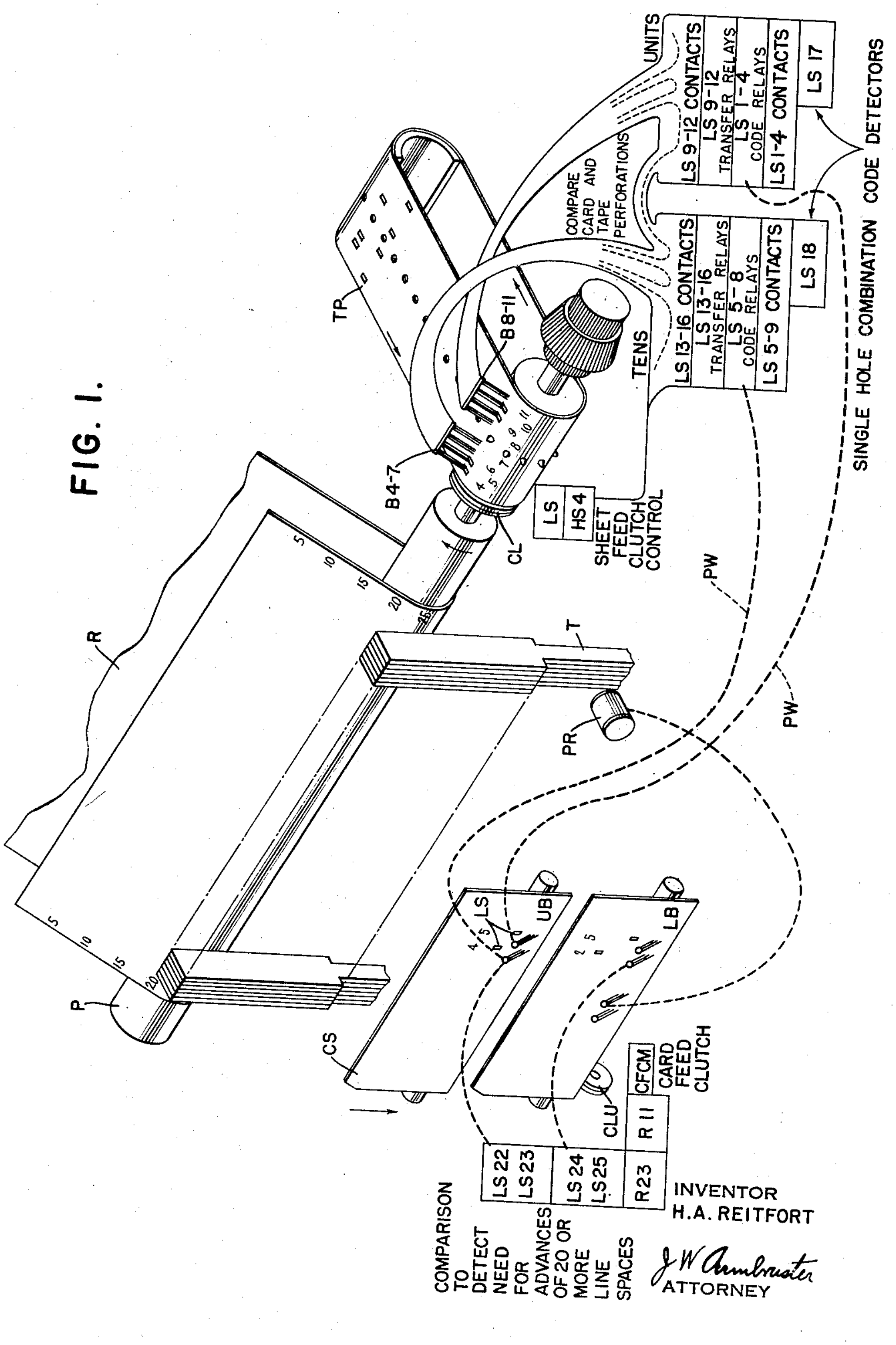

The operation of the line selection devices may be summarized with reference to the diagrammatic showing in Fig. 1. There it is noted that a record strip or sheet R is wrapped around a platen P which is connected through a clutch CL to a control tape TP which is advanced in synchronism with the rotation of the platen and the advance of the record sheet. Control records or cards CS are advanced downward in succession past two lines of sensing brushes, upper brushes UB and lower brushes LB. A plurality of record columns are set aside for line selection perforations LS for designating or representing the line of the record sheet upon which it is desired to record the data sensed on the related card.

From the line selecting upper brushes UB a pair of sets of plug wires PW are connected to units and tens code relays LS1–4 and LS5–8. The energized condition of these primary code relays is transferred to sets of secondary or transfer relays LS9–12 and LS13–16. The transfer relays have control contacts arranged in labyrinth circuits connected as part of comparing circuits involving the tape sensing brushes B4–7, B8–11, relating to the tens and units tape sensing devices respectively.

Ordinarily the tape sensing roller is in one part and the tape sensing brushes related thereto are provided to detect tape perforations corresponding to and aligned with various parts of a form such as the first and last lines of one or more heading spaces and the first and last lines of various form body areas, overflow end positions, etc. However, in the present case the tape contact roller is divided into two separate sections, one for the units order and the second for the tens order. Another change is that involving the tape sensing brushes and the various channels on the tape ordinarily associated with the regular stopping positions already noted. Now, in the novel devices, two sets of four brushes are devoted to code representations or perforations to show units and tens designations representing lines on the record sheet. By punching one or more of the four channels in the tens position, and one or more of the four channels in the units position, it is possible to represent by a series of perforations in a single line across the tape, a multi-denominational number representative of any line of the record sheet R from 1 to 99.

After a record card has been sensed and the line selection code contacts, LS9–16 set up in circuit with the tape sensing brushes B4–11, and the record sheet and tape started to advance in synchronism, then the sheet stopping circuit is only completed when the proper perforations on the tape arrive at the brushes B4–11 to correspond with the line number selected, and then a circuit is completed to the control relay HS4 which in turn controls the clutch magnet LS to terminate feeding operations at the desired printing line position. As shown in the illustration, the record line 25 is taken for purposes of illustration and shown by perforations in the card CS and code perforations in the tape TP.

Other provisions are made to detect whether the line selection numbers of the cards involve one or more of the four tape sensing brushes such as B4–7. These detectors LS17 and LS18 are provided to control the labyrinth circuits so that it may be determined beforehand whether the control circuit is to pass back and forth through the tape sensing brushes or make only one excursion. Relays LS17 and LS18 are picked up separately by contacts arranged therewith and operated by relays LS1-4 and LS5-8, respectively, and so connected that the corresponding relay is picked up only when a single one of four relays is effective but is otherwise ineffective.

Another device is provided to make a comparison between line selection perforations on two successive cards to compare the numbers of the line selections and then detect the need for advances of 20 or more line spaces. At the left side of Fig. 1 is shown diagrammatically how the relays LS22-25 are connected to be picked up successively by the upper and lower line selection brushes in the tens order and thereby detect differences of 20 or more and then operate relays R23 and R11 to effect de-energization of the card feed clutch magnet CFCM to suspend card feeding during spacing of the record sheet through distances greater than 19 line spaces.

As shown in the wiring diagram (Figs. 2*a*–2*d*) the controls of the line selection devices are coordinated with the controls of an alphabet printing tabulator provided with a tape control carriage. The tabulator is of the type described in U. S. Patents, Nos. 2,079,418 and 2,172,067, 2,199,547 and 2,531,885, to which reference may be made for details of construction.

Before describing the manner in which the line selection controls are influenced by the ordinary tabulator and tape feed controls and operations, it is believed well to outline the essential tabulator devices.

In such machines a motor drive is connected through two clutches which are selectively operated for card feeding and printing operations. A number of PBC contacts and CF cam contacts operate only when the card feed clutch is engaged. Certain PM contacts operate only when the printer clutch is engaged. Other CB contacts operate all the time that the motor is active. A series of TS contacts are operated only when a total cycle is initiated.

Figure 2A:
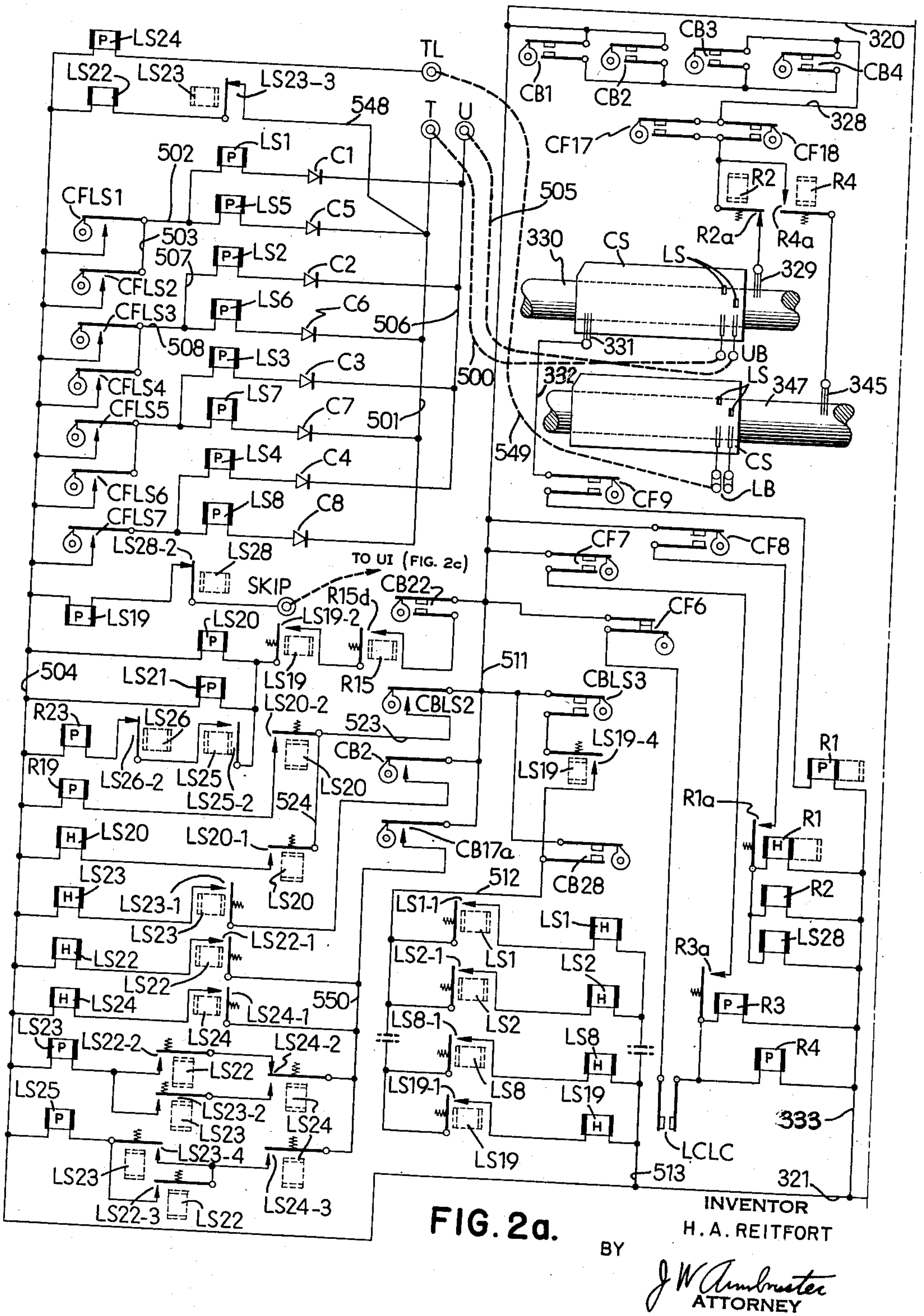
Figure 2B:
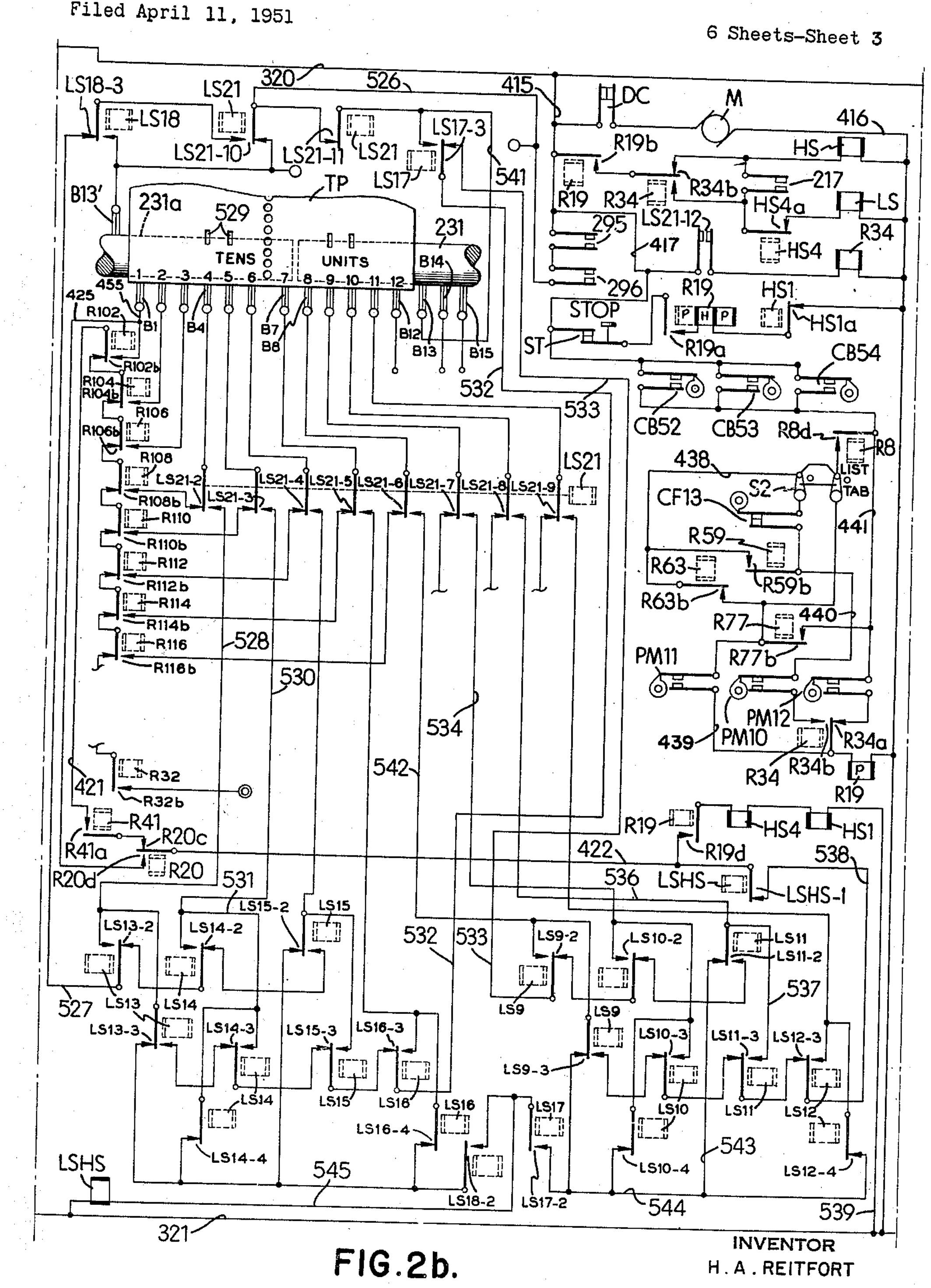
Figure 2C:
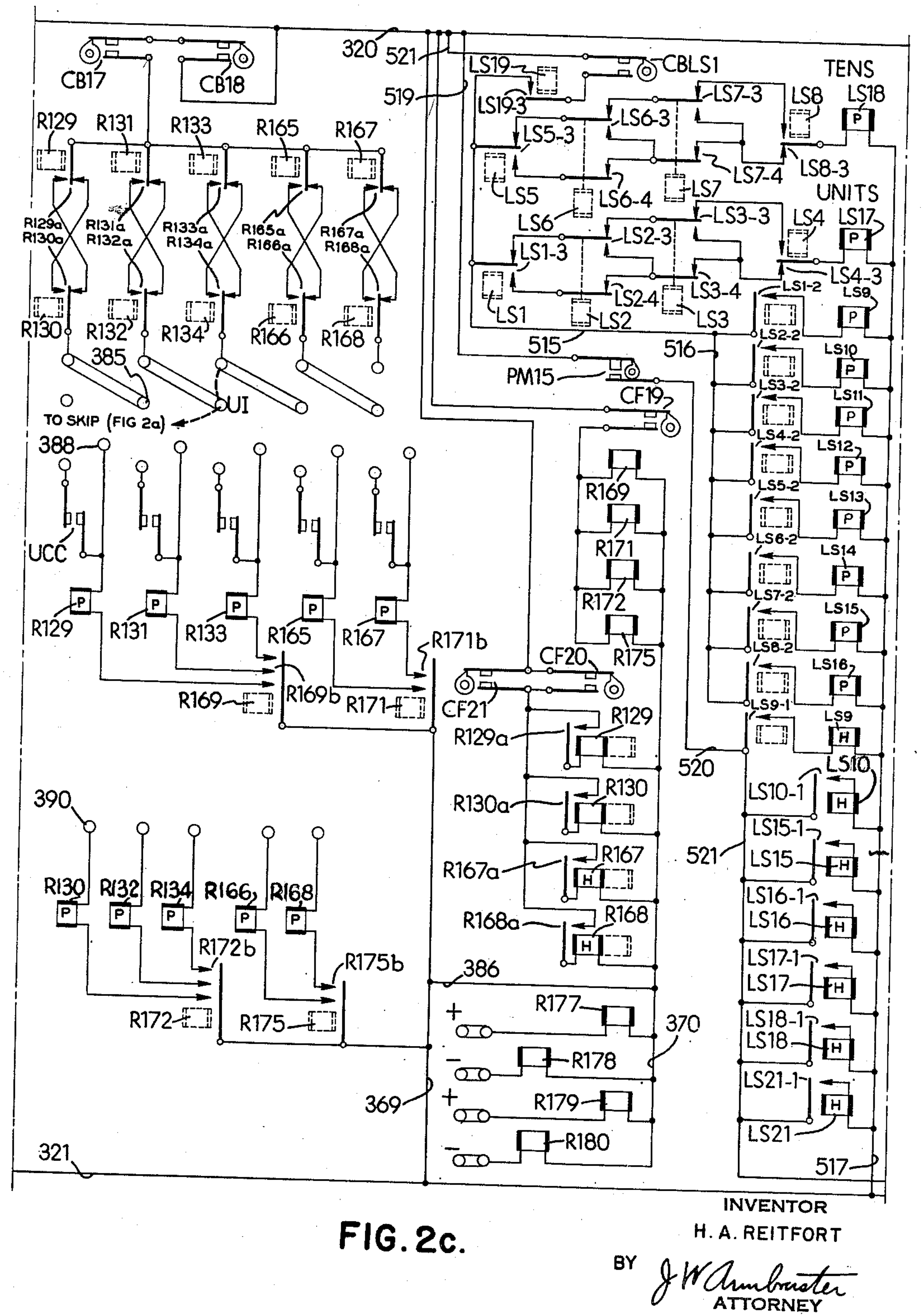
Figure 2D:
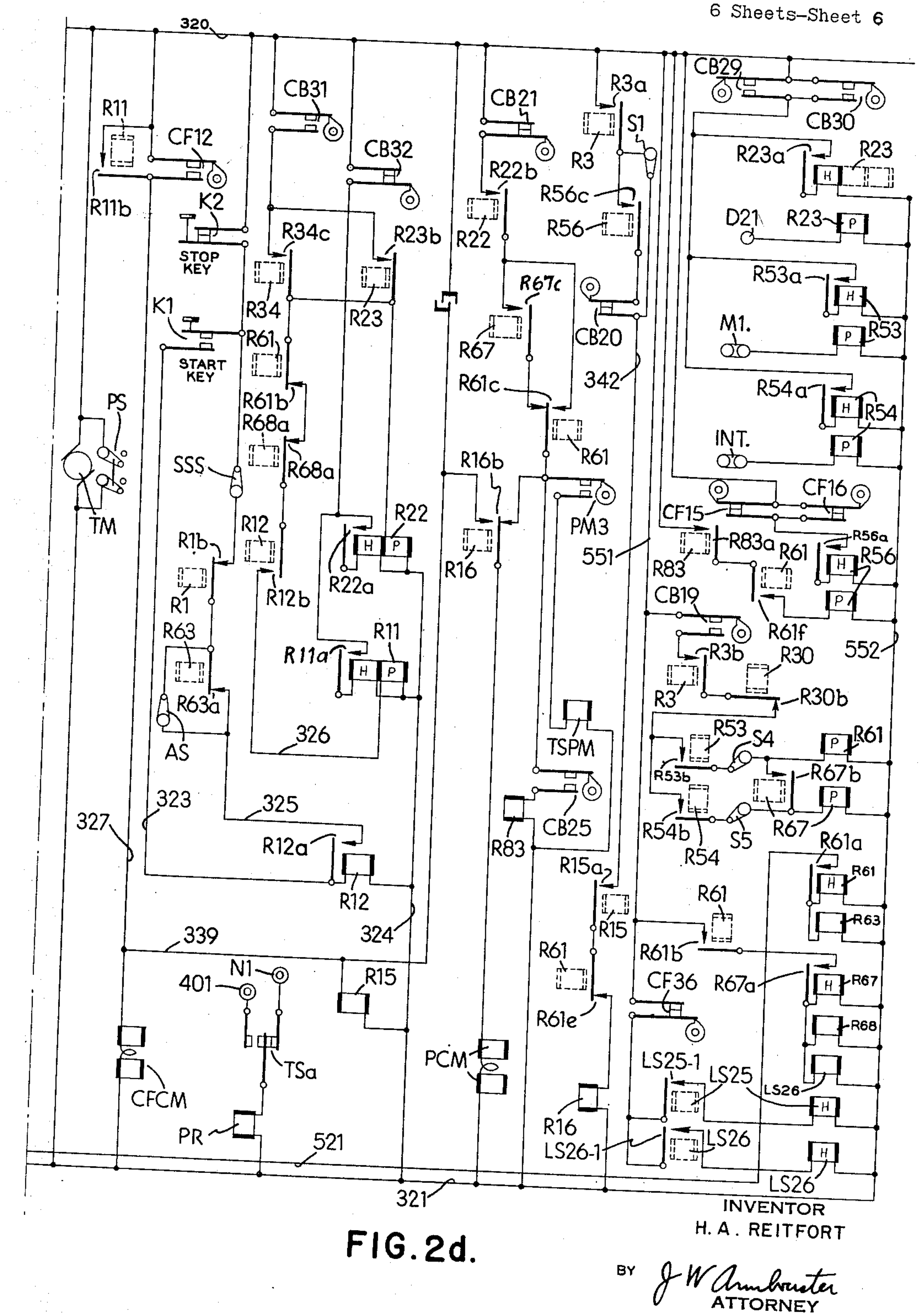

After the cards CS are placed in the feed mechanism feeding cycles are initiated by depressing the start key K1, Fig. 2*d*, of the tabulator. Circuits are then closed to pick up relays R12 and R11, the latter having contacts R11*b* in series with the card feed clutch magnet CFCM which when activated serves to initiate card feeding. When the card feed clutch is effective a picker mechanism is operated and it serves to push the first card out of the magazine and down to the upper brushes UB, Fig. 1.

As the card feed drive starts, a cam contact CF9, Fig. 2*a*, closes to call in relay R1. In Fig. 2*a* it is seen the holding coil of relay R1 is associated with relay R2 and a special line selection coil LS28 mentioned hereinafter. The circuit for relay R1, etc., passes through line 320, timer contacts CB1-4, wire 328, timer contacts CF17 and CF18, contacts R2*a*, common brush 329, the upper brush contact roller 330 and brush 331, wire 332, cam contacts CF9, pickup coil R1, wire 333 and line 321. Relay R1 is then held through contacts CF8 until the first full cycle is well advanced.

Relay R1 is effective to open contacts R1*b*, Fig. 2*d*, and de-energize relay R12 which in turn opens contacts R12*b* to de-energize relay R11 when cam contacts CB32 are opened. The card feed clutch magnet circuit is maintained until near the end of the cycle by the closure of contracts CF12. When the clutch magnet CFCM becomes de-energized, the card feed clutch dog is pulled out of the ratchet wheel to stop the feed.

Under initial starting devices it is necessary to depress the start key a second time to cause a continuous succession of card feed cycles. After the second cycle, the feed unit runs continuously until the card magazine is empty. Cam contacts CF9 cannot energize relay R1, R2 and LS28 as long as cards are feeding because the passing cards insulate the brush 331. The relay R1 remains de-energized and the contacts R1*b* remain closed to maintain the holding circuit for the card feed relay R12. Near the end of the last cycle, contacts CF9 close while brush 331 is effective, and relay R1 then stops the card feed.

The cards advance in succession, Fig. 1, first past the upper brushes UB and then, one card cycle later, under the lower brushes LB. Since they are synchronized in motion past the two sensing stations it is possible to effect comparisons by searching for the perforations therein by means of the spaced lines of brushes UB and LB.

The lower card lever relays R3 and R4, Fig. 2*a*, are energized when the first card passes below the upper brushes UB and they remain energized until the last card passes the lower brushes. The first card closes the lower card lever contacts LCLC after digit analysis under the upper brushes along with closure of cam contacts CF6.

In listing operations the card CS passes the lower brush in synchronism with the upward movement of the type bar T, Fig. 1. Magnets PR operate stop pawls to locate the type bars in positions corresponding to the data punched in a card and at a predetermined time, hammers are tripped to record the information on record sheet R.

Therefore, listing operation requires energization of the card feed clutch magnet CFCM to advance the cards, and energization of the printer clutch magnet PCM for raising the type bars. Magnet PCM is called into operation under control of relays R15 and R16 when switch S1 is set for listing operation. Adjustment of the type bars is regulated by impulses carried to magnets PR from the lower brushes. A printing control circuit involves line 320, Fig. 2*a*, circuit breakers CB1-4, wire 328, timer contacts CF17 and CF18, lower card lever relay contacts R4*a*, common brush 345, contact roller 347, brush LB, a plug wire socket N1, Fig. 2*d*, normally closed contact TS*a*, magnet PR and line 321.

Contacts TS*a* are shifted for total cycles so that printing is then controlled by impulses from an accumulator rather than from the lower brushes.

Group control devices are provided for separately considering different classes or groups of cards as distinguished by different group number perforations for different groups. Consecutive cards are compared; one card being read at the upper brushes, while the preceding card is read at the lower brushes. As long as the card readings are alike the card feed continues to function. When the machine senses that the two group readings are not alike, the feed unit stops, the machine prints the total on the predetermined total line of the sheet which has been brought into position, the accumulator is cleared to zero, and the machine automatically starts feeding the cards of the next group.

As a preliminary to the establishment of group control circuits, a number of preparatory relays R169-R175 (Fig. 2*c*) are energized to close the circuits for the circuits for the comparison relays. The preparatory circuit includes line 320, cam contacts CF19, relays R169-R175, wire 386, wire 369 and line 321. As an example of the effect of these relays, it is seen that relay R169 serves to close contacts R169*b* in series with the group control pickup coils R129–R133.

The actual comparing circuits are connected by plug wiring between the pickup coils and certain upper and lower brushes devoted to sensing group number perforations or special line selection perforations. An example of the comparing circuits is as follows: line 320 (Fig. 2*a*), cam contacts CB1–CB4, wire 328, timer contacts CF17 and CF18, contacts R2*a*, common brush 329, contact roller 330, through the line selection perforation in the card sensed by upper brush UB, a plug wire connected from a socket in line with the upper brush to a socket 388, Fig. 2*c*, in line with the pickup coil of relay R129, contacts R169*b* and wire 369 to line 321. As long as group numbers agree, a companion circuit to that already traced is set up at the same time through a pickup coil of a relay R130 as energized through the lower brushes by the following circuit; line 320 (Fig. 2*a*), cam contacts CB1–CB4, wire 328 contacts CF17 and CF18, contacts R4*a*, common brush 345, contact roller 347, through a line selection perforation in the card sensed by the lower brush LB, a plug wire connected to socket 390, Fig. 2*c*, pickup coil of relay R130, contacts R172*b*, wire 369 and line 321.

Relays R129 and R130 have holding coils and contacts in series therewith for sustaining the comparing circuit connections.

Referring to the upper left hand corner of Fig. 2*c*, it is seen that the pairs of comparing relays are associated with pairs of contacts so arranged that, when a related pair such as relays R129 and R130, are energized at the same time, they fail to provide a circuit path. However, should one or the other be energized alone, showing that there is a disagreement in the group or line selection control perforations, then a circuit is established for initiating group control operation. Assuming that there is a disagreement in the group numbers in the lower orders and that relay R167 is energized before relay R168, then the following circuit is established for setting up a minor control operation: line 320 (Fig. 2*c*), cam contacts CB18, CB17, the left contacts R167*a*, the right contact R168*a*, a plug wire connection between the lower orders and to socket UI, a plug wire to socket "Skip," Fig. 2*a*, through contacts LS28–2, relay LS19 and wire 504 to line 321 for line selection purposes as explained hereinafter. A more usual control is that for plain group control over connections from UI, Fig. 2*c*, by a plug wire to socket MI (Fig. 2*d*), pickup coil of relay R53, wire 552 and line 321. A holding circuit is established for relay R53 due to the closure of contact R53*a* in series with the holding coil. The holding coil of relay R53 operates other contacts R53*b* in series with a minor control pickup coil of relay R61. The minor control circuit includes line 320, cam contacts CB19, lower card lever relay contacts R3*b*, relay contacts R53*b*, switch S4, pickup coil of relay R61, wire 552 and line 321. A holding circuit is established for relay R61 by the closure of contacts R61*a*. Associated with relay R61 is another minor control relay R63 which is energized along with it. These relays have contacts throughout the machine for controlling the suspension of card feeding, the initiation of total taking, etc.

The foregoing description of the group control comparison and the resulting pickup of relays for control purposes is duplicated with respect to other columns or groups of columns on the record cards for intermediate and major control. The particular columns selected for control are made effective by plugging from various sockets such as 385 (Fig. 2*c*) to the socket INT (Fig. 2*d*). Then the intermediate relay R54 is called into action to set up circuits for relays R67, R68 and LS26 similar to that of the minor control described in connection with energization of relay R61.

Referring to Fig. 2*d*, it is seen that the minor control relay R61 has contacts R61*b* in series with the pickup coil of relay R11 for governing the continuance of operation of the card feed clutch magnet CFCM. When the minor control is exercised, the contacts R61*b* are opened to prevent energization of the pickup coil of relay R11. In this manner the feed mechanism is stopped when succeeding cards are not punched alike in the group control field.

The minor relay R63 and the intermediate relay R67, close contacts in series with separate pluggable connections. These connections are used to direct an impulse to the tape controls before printing for selecting a tape brush to control stoppage of the record form with a predetermined total line at the printing point.

The foregoing sections of the description dealing with the wiring and electrical controls are concerned, in the main, with the devices usually found in tabulating machines. The following portions of the specification are devoted to the features of the tape control of record feed and the way the feed controls are coordinated with the tabulator.

In Fig. 2*b* it is seen that the feed motor M is in continuous operation by means of a circuit which is established from line 320, through wire 415, the tape door contacts DC, motor M, and wire 416 to line 321. Associated with motor M are two feed clutches, the one being controlled by the low speed magnet LS, which is energized alone for spacing and skipping, and the other clutch is called in by magnet LS and the high speed interposer magnet HS which is energized to clutch other gearing to skip upon the printing of a total. Most of the wiring is concerned with the operation of one or both of these two clutch control magnets, and stopping the platen and tape drum to which they are connected.

Also shown on Fig. 2*b* is a diagrammatic representation of the split drum **231—231*a*** holding the control tape TP with the spacing controls exercised by the feed control indicia in the tape in association with the fifteen sensing brushes B1–B15.

Before discussing further the nature of the controls for governing the advancement of the tape and the rotation of the platen, it is believed well to point out the arrangement of contacts ordinarily associated with the tape sensing brushes. In Fig. 2*b* it is noted that to each of the first twelve brushes B1–B12 cooperating with tape TP there is attached a contact point such as R102*b* which is part of a normally open side of a pair of contacts. The closed sides of the twelve contacts related to the brushes are arranged in a cascade formation with the circuit connections for the twelfth brush B12 passing through all the normally closed contacts related to all the eleven other brush selecting contacts. In this way, each higher numbered brush is made dependent upon the normal condition of the contacts associated with all other brushes to the left of it. Accordingly, if the connections are selected for two brushes, the brush at the left, that is, the lower numbered brush, will always predominate as having a closed circuit path while the higher order brush has interrupted circuit connections.

The first ten brushes at the left are usually assigned for record strip stopping control. When there is some change in the operation of the tabulator which calls for a feeding operation, one of the brushes is selected to control the end of feeding which is to be terminated at a particular line on a record form. The line position is predetermined by the location of the perforation in the tape and this perforation is aligned with the particular one of the ten tape sensing brushes. Therefore, all that is necessary to control strip location is to provide circuit connections to that particular brush and at the same time initiate feeding. The operation of the platen is synchronized with the motion of the tape, and when the predetermined line is reached the brush extends through the tape and sets up a stopping circuit. The stopping control is usually arranged in a left to right order, that is, brush B1 controls the starting position for recording the very first line on a record form, brush B2 determines the starting position of the second printing block, etc.

Brushes B13 and B13' are used at all times as common contact members in association with conductive parts of the tape carrying drums 231 and 231*a*.

As an accompaniment to every printing operation, it is desired to effect controls for spacing the record strip and also for advancing the control tape to move in synchronism therewith. On every printing operation the PM cam contacts are operated and certain of these are devoted to control for spacing. In Fig. 2*b*, it is shown that three such contacts PM10, PM11 and PM12 are situated in parallel connection and all in series with wiring leading to the pickup coil of relay R19, which controls selection of the low speed clutch magnet LS. These three PM cam contacts are timed differently to control the time that the spacing operation takes place with respect of printing. The PM11 cam contacts are closed at a time while the type bars are moving upward and thereby cause an advance of the platen before printing takes place. Therefore, spacing which is controlled by the PM11 cam contacts is referred to as upstroke spacing. The other two cam contacts PM10 and PM12 are timed to close when the type bars are moving downward after printing has taken place. The spacing accompanying control by contacts PM10 is referred to as downstroke spacing accompanying the restoration of the printing bars. Contacts PM12 are used for space skipping and are effective whenever a tape brush is selected for what is usually a plural line movement of predetermined length.

The operation of line spacing is not only effected by the timing of the PM cams but it is also influenced by the setting of switch S2 (Fig. 2*b*) for listing or tabulating operation. When the switch is set for listing control there is an upstroke spacing operation on every listing cycle and on every totaling cycle.

When the switch is set for tabulating control there is an upstroke spacing operation on group indication cycles and also on intermediate total printing cycles.

Downstroke spacing accompanies every total taking cycle when the switch is set for listing. When the switch is set for tabulating there is a downstroke spacing operation after every major total recording.

The timing of the line space control impulses is made accurate with respect to the tape feed because circuit breaker wheels are geared directly to the tape feeding drum 231 and proportioned to turn one revolution for each cycle of the tape feed. The wheels have teeth for operating the breaker contacts 295, 296, Fig. 2*b*, to close 24 times in each cycle operation of the tape feed wheel. When operating for single line spacing, the impulse through contacts 295 and 296 is used directly to terminate spacing. For multiple line spacing, the second or third closure of contacts 295 and 296 creates an impulse passing through a commutator to stop the feed platen after two or three line spaces of movement. For space skipping, when the length of feed is determined by the location of a perforation in the tape TP, circuit breakers 295 and 296 also govern the time that the impulse is sent through the tape brush, for they are adjusted to close after each possible perforation position is at the brush line, and thereby prevent sparking at the tape.

Whenever a group indication or listing cycle is taken, a circuit is initiated to start the platen moving for line spacing as follows: from line 320 (Fig. 2*b*), the circuit is directed through wires 415 and 417, cam contacts CB52, relay contacts R8*d*, closed after the first card is in wire 438, minor control contacts R63*b* normally closed, cam contacts PM11, wire 439, the pickup coil of relay R19 and wire 416 to line 321. The pickup coil then operates to close associated contacts R19*a* for setting up the holding circuit for relay R19 through the stop contacts ST and the normally closed disabling contacts HS1*a*.

Relay R19 then closes contacts R19*b* in series with the low speed clutch magnet LS. The circuit for starting the rotation of the platen follows a path through line 320, wires 415 and 417, contacts R19*b*, lower contacts R34*b* closed as soon as the feed unit is made effective, normally closed contacts HS4*a*, magnet LS and wire 416 to line 321.

After the platen has been turned through an arc equal to one line space, the circuit breakers 295 and 296 close to send an impulse through relay HS4 to open contacts HS4*a* and disable the clutch magnet LS. The spacing control relay R19 is also deenergized by the operation of relay HS1 which opens contacts HS1*a* in series with relay R19.

A number of line space initiating circuits are made as an aftermath of printing operations in listing and tabulating. Considering first the circuit established after item recording; the connections can be traced from line 320 (Fig. 2*b*), through wires 415 and 417, cam contacts CB53, relay contacts R8*d*, switch S2 in the list position, cam contacts CF13, wire 440, cam contacts PM10, relay contacts R34*b* closed whenever the skipping selection devices are dormant, relay pickup coil R19, wire 416 and line 321. The space selecting relay R19 then operates the call into action the low speed clutch magnet LS as already described with relation to upstroke spacing.

When the tabulator is set for tabulating operations and switch S2 (Fig. 2*b*) has been moved to the right of the position shown, then the line space starting circuit follows a somewhat different path, in that the cam contacts CF13 are out of the circuit path. Instead, the circuit continues through wire 438 and through the major space control relay contacts R59*b* and then over to wire 440 and continues on from cam contacts PM10 as already described.

After the platen starts rotating as the result of an impulse from the downstroke selection circuits, it is stopped by closure of the platen circuit breakers 295 and 296, through circuit connections already described hereinbefore with relation to stopping the feed after one or two or three line spaces of upstroke spaces.

Whenever skipping selection devices are active, contacts R34a are closed and spacing start operation is induced by relay R19 which is made active through closure of cam contacts CB54 and PM12.

As disclosed fully in Patent No. 2,531,885, the tape feed devices are provided with normal controls involving ten tape brush selectors to activate magnets such as R102, R104, etc., Fig. 2b, which serve to put one of the brushes B1–B12 in a control circuit. The controls for relays R102, etc., are pluggable and used in a number of ways to pick up skipping control impulses from various sources in the machine for controlling skipping of the record form to the positions corresponding to the kind of function made evident by the source of the impulse. For example, a digit selector in any of its positions may be connected to any of the selector sockets to select a digital record form line predetermined by the digit perforation in the record card. As another form of control, the sockets can be selectively plugged for group control selection of record skipping after the printing of minor or intermediate totals. Then, too, the sockets can be selectively plugged to any heading control outlets, X distributors, class selectors or "before total" controls.

The suspension of card feeding is at times the accompaniment of skipping control. This hesitation in tabulator operation is provided to allow time for the record strip to move into position before recording is resumed. The control is usually effected by deenergization of a relay R34 with every skip selection and the consequent opening of contacts R34c (Fig. 2d) in series with the card feed clutch magnet controls.

The object of short skip controls is to neutralize the interlock for suspending card feeding and instead provide for the continuous operation of card feeding in the tabulator when the skipping operation is of such a limited extent that it can be accomplished between card feed cycles. A relay R23 shown in the upper right hand corner of Fig. 2d is provided for effecting the short skipping control which is to be plugged to any feed selector calling for the movement of the record form less than 3⅔ inches. It has been found that such a skipping movement can be accomplished without the necessity for interrupting the card feed.

According to the present invention, it is also explained hereinafter that relay R23 is picked up selectively for multi-denominational line selection control so that card feeding is not interrupted for spacings of 19 lines or less.

The foregoing sections of the wiring description deal mainly with the usual tabulating and tape feed control circuits. In the parts of the disclosure which follow, most of the circuits are related to the novel line selection controls.

It is already noted that relay R19, Fig. 2b, controls the start of skipping and that magnet HS1 controls stopping and that relay R23, Fig. 2a, effects an interlock to suspend card feeding for long advances of the record sheet. Control by line selection devices over such feed means is the object of the present portion of the description.

Furthermore, it is seen that relay LS26, Fig. 2d, is picked up with R68 on a group change and relay LS28, Fig. 2a, is picked up with the upper card lever relay R2 and dropped out as long as cards appear under the upper brushes. The latter control is extended throughout the line selection control devices by contacts of a relay LS19, Fig. 2a, picked up in part by contacts LS28–2. The complete circuit for relay LS19 includes, line 320, Fig. 2c, cam contacts CB18, CB17, shifted contact R131a indicating a group change, normally closed contact R132a, unequal impulse plug socket UI, a plug wire to socket "Skip," Fig. 2a (which when omitted disables line selection control), relay contacts LS28–2, the pickup coil of relay LS19 and wire 504 to line 321. Thus relay LS19 is picked up on every cycle because the line selection columns of the cards are plugged to the group control devices to effect an intermediate group change by an impulse at UI for each change in line selection numbers or group numbers if so desired. For listing, relay LS19 will be impulsed for each card feed cycle, and for tabulating it will be impulsed for each group change. Because of contacts LS28–2 the control also depends on continuous appearance of cards at the upper brushes. The energization of relay LS19 is maintained by a holding circuit involving line 320, Fig. 2a, wire 511, cam contacts CB28 closed during index point reading time, wire 512, contacts LS19–1, hold coil LS19, and wire 513 to line 321. Circuit maintenance is extended longer through contacts LS19–4 and cam contacts CBLS–3. A number of contacts of relay LS19 appear at various points in the line selection circuits to control sheet advancing only when cards continue to appear at the upper brushes and to prevent continuous skipping during a runout of the last card.

Referring to Fig. 1 it is seen that the line selection perforations LS of the card CS are sensed by the upper brushes UB of which the units order brush is plugged to U and the four code relays LS1–4, and the tens order brush is plugged to T and the four code relays LS5–8. The same connections are shown more fully in the wiring diagram, Fig. 2a, where it is seen that cam contacts CFLS1–7 are timed so that certain combinations of the four relays are picked up for each digit representing perforation. The chart Fig. 3, shows the particular combination for each digit in both units and tens orders. For example, for the sensed digit perforations of line selection number 25, relays LS5 and LS6 are picked up in the tens order, and relays LS2 and LS3 are picked up in the units order.

The timing chart, Fig. 4, shows that the different CFLS cam contacts are closed at certain various index point positions as follows:

| Cam contacts: | Index points |
|---|---|
| CFLS1 | 7, 4 and 1 |
| CFLS2 | 2 |
| CFLS3 | 8, 5 and 2 |
| CFLS4 | 0 |
| CFLS5 | 5, 4 and 3 |
| CFLS6 | 9 |
| CFLS7 | 9, 8, 7 and 6 |

A sample tens order code relay circuit may be traced on Fig. 2a through line 320, circuit breakers CB1–4, cam contacts CF17 and CF18, card lever relay contacts R2a, common brush 329 to the contact roller 330, through the "2" hole in the card as sensed by the brush UB at "2" time, a plug wire 500, socket T, wire 501, rectifier C5 which prevents back circuits, the pickup coil of relay LS5, wires 502 and 503, cam contacts CFLS2 closed at the "2" time, and wire 504 to the line 321. Relay LS6 is also picked up in a similar fashion through cam contacts CFLS3 also closed at "2" time.

In the units order, a circuit may be followed through line 320, circuit breakers CB1–4, cam contacts CF17 and CF18, relay contacts R2*a*, common brush 329 and contact roller 330, through the "5" hole in the card as sensed by the units brush UB at "5" index time, a plug wire 505, socket U, wire 506, rectifier C2, the pickup coil of relay LS2, wires 507, 508, cam contacts CFLS3 closed at "5" time, and wire 504 to line 321.

As noted at the lower part of Fig. 2*a*, holding circuits are provided for the relays LS1–8 so they are held through either contacts CB28, or contacts CBLS–3 and LS19–4 to condition the feed devices for record sheet advances only when cards are going through the upper brushes UB and to eliminate continuous skipping upon runout of the last card.

A sample holding circuit includes line 320, Fig. 2*a*, wire 511, and then through either cam contacts CB28 alone, or cam contacts CBLS–3 in series with relay contacts LS19–4, then through wire 512, contacts LS2–1, holding coil LS2, and wire 513 to line 321.

As seen at the right side of Fig. 2*c*, the different contacts of relays LS1–8 are connected, respectively, to related pickup coils of line selection transfer relays LS9–16. The latter relays serve to hold the line selection code settings until the midpoint of the cycle following the original reading of the card at the upper brushes. Taking as an example the closure of contacts LS2–2, then relay LS10 is picked up by a circuit including line 320, cam contacts CBLS–1, relay contacts LS19–3, wires 515 and 516, relay contacts LS2–2, pickup coil LS10, and wire 517 to line 321. The effectiveness of relay LS10 is sustained by a circuit through its holding coil as follows: line 320, wire 519, cam contacts PM15, wires 520 and 521, relay contacts LS10–1, holding coil LS10 and wire 517 to line 321.

Relays LS9–16 then serve to close contacts in labyrinth comparing circuits involving the tape sensing brushes B4–11 as shown in Fig. 2*b*. There it is noted that the units transfer relays LS9–12 have contacts arranged to carry an impulse to or from the units tape code brushes B8–11, and in a similar fashion the tens transfer relays LS13–16 have contacts arranged to convey an impulse to or from the tens tape code brushes B4–7. However, before considering the comparing circuits involving the card relay contacts and the tape brushes, it is believed best to first explain other controls involved in the comparing operation.

Referring to the upper right hand corner of Fig. 2*c* it is seen that a pair of relays LS17 and LS18 are wired in series with contacts of the units and tens card code relays LS1–4 and LS5–8, respectively. These relays LS17 and LS18 are provided for the purpose of determining whether the code punchings of each order involve either a single code relay or a pair of code relays. Contacts of relays LS17 and LS18 are present in the tape labyrinth circuits, Fig. 2*b*, and there determine whether one or two passes are to be made through each order labyrinth, i. e., whether the comparing circuit is to be directed through only one tape brush per order or back and forth through two tape sensing brushes.

The contacts in series with relays LS17 and LS18, Fig. 2*c*, are so arranged that a relay is energized when only one code relay is involved but otherwise it remains deenergized. From the chart, Fig. 3, it is apparent that for the digits 0, 1, 3 and 6 only one code relay is used and it is in connection with such digits in the units and tens orders, respectively, that the relays LS17 and LS18 are energized. In the example of the line selection number 25 already taken, both digits involve two code relays and fail to pick up either relay LS17 or LS18. The effect of a digit "2" in using relays LS5 and LS6 may be noted at the top of Fig. 2*c*. Although closure of contacts LS5–3 tends to energize the tens order relay LS18, opening of contacts LS6–4 breaks the chain of connections; and so it is for all dual code representations. It is only when a single code representation per order is involved that an effective circuit is established. Assuming that the card digit perforation is "6" in the units order, then only code relay LS4 is involved and it shifts contacts LS4–3 to provide the following circuit for indicator relay LS17: line 320, wire 521, cam contacts CBLS–1 closed directly after digit analysis, relay contacts LS19–3 closed for line selection control, wire 515, contacts LS1–3, LS2–3 and LS3–3 all normally closed, shifted contact LS4–3, pickup coil LS17 and wire 517 to line 321.

Whenever line selection control is chosen by making relay LS19 effective by plugging to cause it to be impulsed as already noted, then a number of switch contacts of a relay LS21 are shifted from positions establishing circuits for normal tape feed control to close other circuits for line selection control. At the same time and by the same means a relay LS20 is also picked up to close the feed clutch and start the tape feed devices in motion.

The circuit for picking up relays LS20 and LS21 is as follows: line 320, Fig. 2*a*, wire 511, cam contacts CB22, relay contacts R15*d* closed by relay R15 whenever the card feed clutch magnet CFCM is effective, relay contacts LS19–2 closed on all line selection operations, pickup coils LS20 and LS21, wire 504 and line 321.

A holding circuit for relay LS20 involves line 320, wire 511, cam contacts CBLS–2, wires 523 and 524, contacts LS20–1, holding coil LS20 and wire 504 to line 321. Relay LS20 serves to start sheet feeding by activating the usual feed control relay R19 by the closure of contacts LS20–2 and the complete circuit includes line 320, wire 511, cam contacts CBLS–2, wire 523, relay contacts LS20–2, pickup coil R19 and wire 504 to line 321. Relay R19 then closes contacts R19*b*, Fig. 2*b*, to make the feed clutch magnet LS effective to initiate the advance of the record sheet and the control tape.

A holding circuit for relay LS21 includes line 320, Fig. 2*c*, wire 519, cam contacts PM15, wires 520 and 521, contacts LS21–1, holding coil LS21, wire 517 and line 321. Relay LS21 then operates to shift quite a number of contacts such as contacts LS21–2 to LS21–9 at the center of Fig. 2*b* to change to line selection tape control.

In order to stop the record sheet R, Fig. 1, at the line corresponding to the line selection perforations LS in the card, an equal condition must be detected between the code perforations of the tape and the card code relay contact settings of the circuits at the right in Fig. 1. Similarity of line and tape code number perforations is detected when a circuit is completed through the closed card relay contacts and the related tape brushes. When listing, each card is found to be perforated at LS digitally with the line number representative of where the data is to be printed, and, at a corresponding position on the tape, related code perforations are punched. Although the card line number perforations and the tape code number perforations must agree as to digital value, it does not follow that the sheet line selected must be of the same number. For example, in the case of a card punched with a line selection number of 05, it is not necessary that the data thereof must be placed on the fifth line of the record; instead, the sheet advance can be carried to any line which is preselected by the position at which the tape is punched with the code perforations 05, and there is where the tape and sheet are stopped to await recording.

To simplify matters it is assumed for example that the tape and card are perforated for line selection with the indicia 25 and that the twenty-fifth line of the record sheet is to be brought into printing position. It is noted hereinbefore, that when a card is sensed under the upper brushes UB with the line selection perforations LS of the value 25, then relays LS2, 3, 5 and 6 are picked up and in turn pick up transfer relays LS10, 11, 13 and 14. It is about to be explained how the contacts of the latter enter into a completed comparing circuit for stopping the sheet at the twenty-fifth line as seen in Fig. 1.

As the record sheet R and the tape TP advance in synchronism and come into the position wherein the twenty-fifth line of the sheet is at the printing line; then, at the same instant, the tape portion under brushes B4–11 is sensed as punched in the 4, 5, 9 and 10 channels to represent 25, and a "Skip End" or stoppage circuit is completed as follows: line 320, Fig. 2*b*, wire 415, carriage circuit breakers 295 and 296, wire 526, normally open switch relay contacts LS21–10, normally closed contacts LS18–3, wire 527, normally open contacts LS13–2, wire 528, normally open contacts LS21–2, tape brush B4 and through a perforation 529 in the tape TP and in contact with the split contact roller portion 231*a*, and back through another tape perforation in the fifth channel to tape brush B5, normally open contacts LS21–3, wires 530 and 531, normally open contacts LS14–3, normally closed contacts LS15–3, LS16–3, wire 532, LS17–3, wire 533, LS9–2, in succession, then through normally open contacts LS10–2, wire 534, normally open contacts LS21–7, tape brush B9 and through a perforation to contact roll portion 231, and back through another tape perforation in the tenth channel to brush B10, normally open contacts LS21–8, wires 536 and 537, normally open contacts LS11–3, normally closed contacts LS12–3, wire 538, normally closed relay contacts LSHS–1 (provided for irregular sequence as noted hereinafter), relay contacts R19*d* now closed, skip end relays HS4 and HS1 and wire 539 to line 321.

Relay HS4 then operates to open contacts HS4*a* in series with clutch magnet LS which opens the sheet feed clutch and brings the sheet space skipping motion to an end with the twenty-fifth line of the sheet at the print receiving position to record the data of the card as analyzed under the lower brushes LB governing the type bar positions.

It will be noted in the foregoing that the comparing circuit with two code positions in each denomination, involved two passes through the contacts LS9–16, i. e., up through the contacts first, through two tape brushes, and then down through the contacts again. A different set of conditions prevail when only one code position is involved and then there is necessity for only one pass through a tape brush and related contacts. Assuming that there is a single code setting in the tens order, then relay LS18 is called into play by the circuit noted hereinbefore at the top of Fig. 2*c*, and the comparing circuit starts through line 320, Fig. 2*b*, wire 415, circuit breakers 295, 296, wire 526, normally open switch relay contacts LS21–10, normally open contacts LS18–3 now closed for single code position control, common brush B13′, contact roll portion 231*a*, a single tens tape brush and through selected relay contacts to the relay contacts LS17–3 where, if a two position code value is involved in the units position, the circuit is through the normally closed side of LS17–3 and wire 533 as before, however, if a single code position is involved in the units order, then relay LS17 is activated, the normally open side of LS17–3 is closed and the circuit continues through wire 541, common brush B13, contact roller 231, a single units tape brush, and certain closed contacts leading to relay HS4 and termination of sheet advancing.

By use of the described comparing control circuit it is possible to arrange the cards in any desired sequence and record the data of them on any line of the form or forms in accordance with the card and tape punchings. In the case of tabulating rather than listing operation, the line selection perforations are punched in the first card of the group, i. e., either a heading card or a first item card and accordingly the feed is controlled to advance to either or both of the first heading line and the predetermined total line.

An LSHS high speed relay is provided to prevent establishment of the comparing circuit when an irregularity in card sequence is found. There is the condition that if the tape TP bears a two hole code punching preceding a single hole code punching (said single hole corresponding in position to one of the two holes), and cards corresponding to the two hole code are missing, it would be possible to get a circuit through the common brush, the contact roller, and the other hole of the two hole tape code to relay HS4 to end skipping were it not for the opening of contacts LSHS–1 of relay LSHS which is picked up by a circuit through the "single hole" relay contacts LS17–2 or LS18–2. This is best illustrated by an example assuming that the sequence of line code numbers is 16, 24, 21, and that in the particular run there are no 24 cards and therefore the line of code punchings 24 in the tape must be skipped. As the card with code No. 21 passes the upper brushes UB, code relays LS1, 5 and 6 are first energized, and then the corresponding transfer relays LS9, 13 and 14 with the "single code" relay LS17 are next energized. Since the card ahead of card 21 (not 24 in this instance, but 16) has finished controlling recording, and feeding is initiated, the tape is moved and sensed and when the code holes for 24 are sensed, the following is the kind of erroneous circuit which must be prevented from controlling sheet stoppage: line 320, Fig. 2*b*, wire 415, circuit breakers 295 and 296, wire 526, relay contacts LS21–10 normally open, normally closed contacts LS18–3, wire 527, normally open contacts LS13–2, wire 528, normally open contacts LS21–2, brush B4, tens contact roll 231a back through brush B5, normally open contacts LS21-3, wires 530 and 531, normally open contacts LS14-3, normally closed contacts LS15-3 and LS16-3 in succession, wire 532, normally open contacts LS17-3, wire 541, common brush B13, units contact roll 231, and through the tape to brush B8, normally open contacts LS21-6, wire 542, normally open contacts LS9-3, normally closed contacts LS10-3 and LS11-3 and LS12-3 in succession, wire 538, relay contacts LSHS-1, relay contacts R19d, relays HS4, HS1, to cause skip stopping and wire 539 to line 321. Such a circuit would cause sheet stoppage corresponding to code number 24 where actually code 21 has been sensed and set up from the card. However, another error correcting circuit to relay LSHS is also set up early and it opens contacts LSHS-1 to prevent the circuit already traced from being completed. The sequence correcting circuit is in part as follows through the tape brush B10 which is part of the tape code sensing parts for code No. 24 but not part of code No. 21. From the units contact roll 231, brush B10, normally open contacts LS21-8, wire 536, normally closed contacts LS11-2, wires 543 and 544, "single hole" relay contacts LS17-2 now closed because of the "1" part of the code number 21, wire 545, relay LSHS and line 321. Relay LSHS then opens contacts LSHS-1 before the wrong kind of skip stop circuit can be completed. When the record sheet and the tape reaches the line corresponding to code No. 21 in the tape then there is no code hole for brush B10 and no separate circuit extends to the high speed relay LSHS, and then the skip stopping circuit to relay HS4 is correctly effected.

Another way of explaining the action of correcting relay LSHS is to note that for all single place code settings a "single hole" relay LS17 or LS18 is picked up, and one or both of them are seen to close contacts (at the bottom of Fig. 2b) in series with relay LSHS so that when one place of an erroneous double place code is unused in the comparing circuit, it is used to carry an impulse down far enough in the labyrinth to go through the "single hole" contacts and relay LSHS which in turn acts quickly to negate a possible comparing circuit.

As noted at the left in Fig. 1, a series of relays LS22-25 are connected to the tens order line number sensing brushes. They provide a checking or comparison circuit to detect the call for advances of 20 or more line spaces. The timing of the tabulator and tape controlled feed is such that no more than 22 spaces can be skipped between printing operations without stopping or suspending operation of the card feed. The circuit is controlled to operate on a differential of more than one in the tens column, so that actually the maximum permissible number of lines skipped without affecting the card feed is 19, and control may result with as low a difference as 11 line spaces (i. e., when the difference is such as between line numbers 19 and 30).

To provide the foregoing controls, relay LS22 is plugged to upper brush UB sensing the tens order column of line selecting perforations LS, Fig. 2a, and relay LS24 is plugged to lower brush LB also sensing the tens order column.

The chart shown in Fig. 5 is helpful in showing the sequence of operation of the relays LS22-25 and the way they cooperate in three different examples, assuming first equality of tens order number, then differences of one, and finally the control differences of two.

Assuming that the sheet movement is to be less than ten line spaces and that the digit four is represented in the tens order, as in the first example of the chart, then both relays LS22 and LS24 are picked up at "4" over these two circuits. From the upper brushes there is a circuit with line 320, circuit breakers CB1-4, wire 328, cam contacts CF17 and CF18, relay contacts R2a, common brush 329, roller 330, through the second card CS, tens brush UB, plug wire 500, socket T, wires 501 and 548, normally closed contacts LS23-3-3, the pickup coil of relay LS22, wire 504 and line 321. At the same time a somewhat similar circuit involves contacts R4a, common brush 345, roller 347, through first card CS, tens order lower brush LB, plug wire 549, socket TL, pickup coil LS24, wire 504 and line 321.

Holding circuits for the two line checking relays are seen to involve cam contacts CB17a, Fig. 2a, which close for short inter-digital durations. The circuits include line 320, wire 511, cam contacts CB17a, wire 550, then separately through the two pickup contacts LS22-1 and LS24-1 now closed, hold coils LS22 and LS24, wire 504 and line 321.

If both LS22 and LS24 are effective together then they pick up relay LS25 (bottom of Fig. 2a) through CB17a by joint closure of LS22-3 and LS24-3.

Relay LS25 is held through cam contacts CF36, Fig. 2d, and a circuit involving line 320, wire 551, cam contacts CF36, relay contacts LS25-1, hold coil LS25, wire 552 and line 321. Relay LS25 then closes contacts LS25-2, Fig. 2a, and a circuit is completed through a pickup coil of the interlock relay R23 as follows: line 320, wire 511, cam contacts CB22, relay contacts R15d and LS19-2, comparing relay contacts LS25-2, intermediate group control contacts LS26-2, pickup coil R23 and wire 504 to line 321. Relay LS26 is wired with intermediate group control relay R68, Fig. 2d, and used in the interlock circuit to prevent feeding while printing on operations of skipping from form to form on continuous webs. For example, in a case where line 22 of one form precedes line 23 of the succeeding form, an equal condition would be set up due to the equal "2" in the tens columns and relay R23 would be energized when a really long shift is involved. Therefore, it is necessary to plug for intermediate or major group change control at the end of each form of continuous webs.

Turning back to consideration of interlock relay R23, it is seen on Fig. 2d that it is held through cam contacts CB29 and CB30, and pickup contacts R23a. The contacts R23b are in series with relay R11 which in turn has contacts R11b in series with the card feed clutch magnet CFCM. Therefore, on detection of the equal condition of "4" in the tens order of line selection (indicating a short skip or record skip) relays LS22, LS24, LS25, LS19, LS26, R23 and R11 all play a part in keeping clutch magnet CFCM active and the cards continuing to feed.

In the case of the second example on the chart of Fig. 5, that is the one involving a difference of one in the tens order line selection numbers, then the relay LS23 enters into the operation to bridge the gap between the activation of relays LS22 and LS24. This is done by the use of the circuit through the pickup coil of relay LS23 as noted at the lower left side of Fig. 2a. There it is seen that if relay LS22 is activated before relay LS24, a circuit is completed through line 320, wire 511, contacts CB17a, wire 770, relay contacts LS24-2, contacts LS22-2 now closed, pickup coil LS23, wire 504 and line 321. Relay LS23 is held through cam contacts CB2 and own contacts LS23-1. Since relay LS23 also has contacts LS23-4 in series with relay LS25 and since they are closed at the time contacts LS24-3 close, relay LS25 is picked up as before through cam contacts CB17a and again picks up interlock relay R23 to keep cards in motion.

For the third example of Fig. 5 it is assumed that a difference of "2" is in the tens order of line selection. Then it is noted that although relays LS22 and LS23 are picked up in rapid succession and relay LS24 is picked up later, relay LS23 is dropped out before relay LS24 is picked up and therefore relay LS25 cannot be picked up as usual. The result is that contacts LS25-2, Fig. 2a, remain open, and relay R23 is inactive and causes inactivity of relay R11 and consequent opening of contacts R11b to deenergize the card feed clutch magnet CFCM to suspend card feeding.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine controlled by a succession of records each bearing data indicia and line number representing line selection indicia for selecting the line of a strip upon which the data is to be recorded, means under control of said data indicia for recording the data on the strip, means for feeding the strip including a feed control tape which bears separate indicia corresponding to the line selection identification of each line, and electrical control means for said feeding means and operated under joint control of the record line selection indicia and the tape indicia for stopping the strip in the selected recording positions.

2. A machine according to claim 1 in which the record line selection indicia is in digital form and the tape indicia is in coded form, and said control means includes means for converting the digital record indicia into coded form for comparison with the tape indicia.

3. A machine according to claim 1 including means for sensing said line selection indicia of a record, code relays set up under control of said sensing means to represent a line number, sensing means for said tape indicia, contacts controlled by said code relays, and said electrical control means includes a comparing circuit through said tape sensing means and said contacts of the record code relays.

4. In a machine for recording on a record strip at predetermined line positions, means for setting up data to be recorded and the number of the strip line upon which it is to be recorded, means for comparing a succession of the line number settings to detect the magnitude of the required strip feed, means under control of the comparing means for detecting required feeds exceeding a predetermined limit, and means under control of said detecting means for holding up the setting means in the instances of feeds exceeding the limit.

5. In a device for comparing indicia appearing at spaced intervals in columns on records, means for feeding said records in succession, first and second sensing means for sensing the indicia of a succession of records, a first relay picked up under control of the first sensing means, a second intermediate relay picked up under control of the first relay and held for a predetermined interval as a measure of controlling indicia value, a third relay picked up under control of said second sensing means, and means under control of said second and third relays for exercising operational control as long as the indicia of two successive records differ only by the measure of controlling indicia value represented by the interval said intermediate relay is held.

6. In a record controlled machine for recording on a strip a succession of data listings from data indicia on the records at lines predetermined by line selection indicia on the records, means for feeding said strip, means for feeding said records, means for sensing said data indicia, data recording means, means under control of said data sensing means for controlling data recording means, means for sensing a succession of said line selection indicia, a plurality of relays under control of said line sensing means for comparing a succession of line selection sensings to detect the amount of required strip feed, and means under control of said relays for suspending operation of said record feeding means when a predetermined amount of feed is to be exceeded.

7. In a control circuit with separate paths for single and multiple code selections, means for representing in code single and multiple place settings of a several place code, means for setting said representing means with data representing code settings, means for detecting in said representing means a single place setting as distinguished from a multiple place setting, and means under control of said detecting means for selecting the single selection path in said control circuit.

8. In a record controlled machine for recording on selected lines of a strip as determined by line selection indicia on the records, means for sensing said indicia, a series of line selection relays under control of said sensing means, feeding means for said strip, a feed control tape connected to said feeding means, said feed control tape bearing a series of multiple place code positions with indicia in single and multiple place appearances, a series of sensing means cooperating with said tape to sense said indicia, a labyrinth circuit with relay contacts of said line selection relays representing record indicia, said circuit involving wires between said sensing means and said contacts for making a path through which a pulse may make a single pass through one sensing means in the case of single code indicium and a path through which a pulse may make a plurality of passes through a plurality of sensing means in the case of multiple code indicia.

9. In a machine for operating on a sheet, means for setting up plural code representations of desired sheet stopping positions in which the sheet is to be operated upon, a feed control tape with indicia for controlling the positioning of said sheet, said indicia comprising a plurality of code indicium for each position, means for advancing said sheet and said tape in synchronism, means for operating said advancing means, means for sensing said indicia, and means under joint control of said code setting means and said code sensing means to disable said operating means to stop said sheet in predetermined positions.

10. In a machine for operating on a record strip, means for setting up a succession of coded impulses representative of desired strip line selection positions, a feed control tape with position selecting indicia for controlling the feeding of said strip, said indicia comprising a plurality of sets of multi-denominational code indicium for each strip position, a rotatable means for advancing said strip and said tape, a driving means, a clutch between said driving means and said rotatable means, means for sensing said indicia, means for detecting the settings of said setting means, and electrical controls under control of said sensing and detecting means for operating said clutch to control the feeding of said strip.

11. In a machine for recording on a record strip, a platen for holding said strip, a driving means, a clutch between said driving means and said platen, means for setting up a succession of coded impulses representative of desired strip line selection positions, a feed control tape with line representing indicia for controlling the feeding of said strip, means for comparing the indicia of the setting means with the indicia on the tape, means connected to said platen for supporting and moving said tape, and means under control of said comparing means for operating said clutch to control the feeding of said strip.

12. In a machine for operating on a record strip, an endless feed control tape with strip feed indicia placed regularly thereon in a pattern of successive arrangements of a plurality of sets of code indicia at all line positions, each lateral line of code indicia being representative of a different recording line on said strip, a line of sensing devices extending laterally across the tape, means for setting up a succession of coded impulses representative of desired strip line selection positions, means for selecting the impulsing of said setting means seriatim, means under control of said sensing devices and said impulses setting means for matching the setting of line selection positions with successive tape indicia, means for advancing said strip and said tape in synchronism, and means under control of said matching means for feeding said strip to a succession of predetermined positions.

13. In a machine for operating on a record sheet, record controlled means for setting up line selection indicia devices representing desired sheet operating positions, a feed control tape with position representing code indicia related to the operating positions of the sheet, a main operating means, means under control of said operating means for sensing said indicia, means under control of said operating means for feeding said sheet in synchronism with the sensing of the indicia on said feed control tape, and means under control of said indicia devices of said setting means and said tape sensing means for controlling said feeding means to feed said sheet predetermined distances.

14. In a machine for operating on a sheet, record controlled means for setting up line selection indicia devices representing desired sheet stopping positions in which the sheet is to be operated upon, a feed control tape with indicia for controlling the positioning of said sheet, said indicia comprising a plurality of code indicium for each position, means for advancing said sheet and said tape in synchronism, means for operating said advancing means, means for sensing said indicia, and means under joint control of said indicia devices of said setting means and said tape sensing means to disable said operating means to stop said sheet in predetermined positions.

15. In a machine for operating on a record strip, record controlled means for setting up line selection indicia devices to represent a plurality of predetermined recording positions of the strip, a feed control tape with position selecting indicia for controlling the feeding of said strip, said indicia comprising a plurality of sets of multi-denominational code indicium for each strip position, a rotatable means for advancing said strip and said tape, a driving means, a clutch between said driving means and said rotatable means, means for sensing said indicia, means for detecting the indicia device settings of said setting means, and electrical controls under control of said sensing and detecting means for operating said clutch to control the feeding of said strip.

16. In a machine for recording on a record strip, a platen for holding said strip, a driving means, a clutch between said driving means and said platen, record controlled means for setting up line selection indicia devices representative of strip recording positions, a feed control tape with line representing indicia for controlling the feeding of said strip, means for comparing the indicia of the devices of the setting means with the indicia on the tape, means connected to said platen for supporting and moving said tape, and means under control of said comparing means for operating said clutch to control the feeding of said strip.

17. In a machine for operating on a record strip an elongated feed control tape with strip feed indicia placed regularly and differentially thereon in a pattern of successive arrangements of a plurality of sets of code indicia at all line positions and single indicium at different line positions, each lateral line of code indicia being representative of a different recording line on said strip, said single indicia being located relative to desired successions of record receiving lines on the strip, a line of sensing devices extending laterally across the tape, record controlled means for emitting a succession of coded impulses representative of desired strip line stopping positions, means under control of said sensing devices and said impulses emitting means for matching the record controlled impulses and the tape controlled impulses, means for advancing said strip and said tape in synchronism, and means under control of said matching means and said single tape indicia for feeding said strip to a succession of predetermined positions.

18. In a record control means for operating on a strip, said records bearing line representing indicia having a digital relationship to desired positions for control of the feeding of said strip, means for analyzing said records, means under control of said analyzing means for setting up a code representation of the line selecting indicia, a feed control tape with line selecting indicia to control the feeding of said strip, said tape indicia being arranged in sets for each line selection, each set comprising a plurality of code indicia, means for sensing said tape, means for feeding said strip and said tape in synchronism, means for comparing the code setting means of the records with the line selection indicia of the tape, and means under control of said comparing means for controlling said feeding means to feed said sheet to predetermined positions.

19. In a machine controlled by heading and detail cards to print on a record strip divided into forms with a plurality of heading, item and total areas, certain of said heading and detail cards bearing line selection indicia to control long feeding movements of said strip, said indicia having a digital relationship to desired strip recording positions, means for sensing said card indicia, means under control of said sensing means for setting up electrical code representations of predetermined line numbers, a feed control tape with a full set of line selection indicia thereon to identify all lines of said areas of heading, amount and total areas on said strip, means for sensing said tape indicia, means for comparing said tape indicia with said card line selecting indicia, means for feeding said strip and said tape in synchronism for line spacing and long feeding advances, means under control of said card sensing means for initiating operation of said feeding means and means under control of said tape sensing means and said comparing means for stopping said feeding means to put the strip in desired heading, item and total print receiving positions.

20. In a machine controlled by a succession of records each bearing data indicia and numeral identifying line selection indicia for representing and selecting the line of a strip upon which the data is to be recorded, means under control of said data indicia for recording the data on the strip, means for feeding the strip including a feed control tape which bears a regular succession of indicia corresponding to and representing the line selection identifications of all lines, group control devices under control of said record line selecting indicia, control means for said feeding means and operated under joint control of the record line selection indicia and the tape indicia for stopping the strip in the selected recording positions, and means under control of said group control devices for initiating operation of said control means.

21. In a machine controlled by records bearing data indicia and code number indicia, means for sensing said indicia, means under control of said sensing means for recording the data on a record sheet, a sheet spacing means for advancing said sheet between printing operations, a spacing control means with a series of code impulse conductors for predetermining the stopping positions of said advancing means, a code number storing means with primary and secondary code relays operated by said record code indicia sensing means, contacts operated by said secondary relays, and means for establishing a predetermined relationship between said code number storage contacts and said spacing control conductors to cause stopping of the sheet at certain lines under control of the sensed code number indicia of certain numbers.

22. The combination set forth in claim 21, wherein the spacing control means includes a feed control tape with sets of line selection code indicia and said conductors are sets of brushes for reading said tape indicia, said brushes being connected in series with said relay contacts in a labyrinth circuit which is closed by coincidence of the tape indicia with the record code number indicia, and means under control of said circuit for operating said sheet stopping means.

23. A machine controlled by records arranged in groups and bearing data indicia and group number indicia, means for sensing said indicia, means under control of said sensing means for printing the data on the record sheet, means for line spacing and long feeding said sheet, a control tape with line selection code indicia arranged according to multi-denominational values, means for reading said code indicia seriatim in synchronism with the operation of said spacing means, a set of group number contacts arranged in code according to multi-denominational values, means under control of said sensing means for selecting said group number contacts according to the group number indicia on a sensed record, a line selection control means cooperating with said spacing means to effect spacing to predetermined lines, and means for connecting said control means electrically in series with pairs of certain line selection code reading means and related group number contacts to be impulsed therethrough, whereby data of any group can be recorded on any line.

24. The machine of claim 23 with a relay operated under control of said sensing means to distinguish between group number contacts of single and multiple selections, contacts of said relay in a branch of said connecting means, and a second interlock relay in said branch of said connecting means to prevent impulsing of the line selection control means when single code selections can be initiated by multiple code readings.

HENRY A. REITFORT.

References Cited in the file of this patent

UNITED STATES PATENTS

| Number | Name | Date |
|---|---|---|
| 2,531,885 | Mills et al. | Nov. 28, 1950 |